(12) United States Patent
Walsh et al.

(10) Patent No.: US 8,112,531 B2
(45) Date of Patent: Feb. 7, 2012

(54) GROUPING OF SESSION OBJECTS

(75) Inventors: Rod Walsh, Tampere (FI); Harsh Mehta, Tampere (FI); Toni Paila, Degerby (FI)

(73) Assignee: Nokia Corporation, Espoo (FI)

( * ) Notice: Subject to any disclaimer, the term of this patent is extended or adjusted under 35 U.S.C. 154(b) by 1293 days.

(21) Appl. No.: 10/890,273

(22) Filed: Jul. 14, 2004

(65) Prior Publication Data

US 2006/0015568 A1 Jan. 19, 2006

(51) Int. Cl.
*G06F 15/16* (2006.01)
(52) U.S. Cl. ...................................................... 709/227
(58) Field of Classification Search .................... 709/227
See application file for complete search history.

(56) References Cited

U.S. PATENT DOCUMENTS

| | | | |
|---|---|---|---|
| 5,666,645 A | 9/1997 | Thomas et al. | |
| 5,892,910 A | 4/1999 | Safadi | |
| 6,057,886 A | 5/2000 | Van Gestel | |
| 6,108,706 A | 8/2000 | Birdwell et al. | |
| 6,209,131 B1 | 3/2001 | Kim et al. | |
| 6,286,034 B1 | 9/2001 | Sato et al. | |
| 2002/0144254 A1 | 10/2002 | Owada | |
| 2003/0088778 A1* | 5/2003 | Lindqvist et al. | 713/182 |
| 2004/0167925 A1* | 8/2004 | Visharam et al. | 707/104.1 |
| 2005/0223098 A1* | 10/2005 | Rimac et al. | 709/227 |
| 2009/0085724 A1* | 4/2009 | Naressi et al. | 340/10.6 |

FOREIGN PATENT DOCUMENTS

| | | |
|---|---|---|
| EP | 0874 486 A3 | 10/1998 |
| EP | 1487216 A2 | 12/2004 |
| FR | 2 797 548 | 2/2001 |
| JP | 10-247943 A | 9/1998 |
| WO | WO 2004/056096 | 7/2004 |

OTHER PUBLICATIONS

M. Luby et al., "Asynchronous Layered Coding (ALC) Protocol Instantiation," RFC 3450, The Internet Society, Dec. 2002 (downloaded from http://www.ieft.org/rfc3450.txt).
B. Whetten et al., "Reliable Multicast Transport Building Blocks for One-to-Many Bulk-Data Transfer," RFC 3048, The Internet Society, Jan. 2001 (downloaded from http://www.ieftorg/rfc3048.txt).
B. Adamson et al., "NACK-Oriented Reliable Multicast (NORM) Building Blocks," The Internet Society, Nov. 2003 (downloaded from http://www.ieft.org/internet-drafts/draft-ietf-rmt-bb-norm-08.txt).
B. Adamson et al., "NACK-Oriented Reliable Multicast (NORM) Protocol," The Internet Society, Mar. 2003 (downloaded from http://waterspring.org/pub/id/draft-ietf-rmt-pi-norm-06.txt).

(Continued)

*Primary Examiner* — Vivek Srivastava
*Assistant Examiner* — William J Goodchild
(74) *Attorney, Agent, or Firm* — Ditthavong Mori & Steiner, P.C.

(57) ABSTRACT

An object delivery session, such as a File Delivery over Unidirectional Transport (FLUTE) session, is joined and a description of a plurality of objects provided by the session are provided. The description indicates one or more groupings of the plurality of objects. An interesting object is determined from the plurality of objects. Based on the interesting object and the description of the plurality of objects, one or more of the plurality of objects are identified for downloading.

45 Claims, 7 Drawing Sheets

OTHER PUBLICATIONS

M. Luby et al., "Layered Coding Transport (LCT) Building Block" RFC 3451, The Internet Society, Dec. 2002 (downloaded from http://www.ieft.org/rfc/rfc3451.txt).

T. Paila, et al., "FLUTE-File Delivery over Unidirectional Transport" The Internet Society, Jun. 2004 (downloaded from http://www.ieft.org/internet-drafts/draft-ietf-rmt-flute-08.txt).

"Transmission System for Handheld Terminals (DVB H)", DVB Document A081, Jun. 2004, pp. 1-11.

"IP Datacast Baseline Specification; Specification of Interface I_MT", DVB Interim Specification, DVB Document A080, Apr. 2004, pp. 1-37.

"IP broadcasting to handheld devices based on DVB-T", DVB H Handheld.

"DVB-H Outline"; AHG DVB TM-H; DVB-H185r3, Sep. 12, 2003.

U.S. Appl. No. 10/743,948, filed Dec. 24, 2003, Rod Walsh, et al.

Decision on Grant in corresponding Russian Application No. 2007105492/09 (005952), Mar. 16, 2009, pp. 1-23.

Japanese Office Action for corresponding JP Application No. 2007-520908, Dec. 14, 2009, Japan.

Luoma, J., et al.: A Metadata Framework for Internet Media Guides: Baseline Data Model. The Internet Society, 2003, pp. 1-24.

Canadian Office action for corresponding CA app. No. 2 573 388 dated Aug. 16, 2010, pp. 1-5.

European Office action for corresponding EP app. No. 05 756 288.6 dated Sep. 30, 2010, pp. 1-4.

Flute—File Delivery over Unidirectional Transport, draft-ietf-rmt-flute-06.txt, Paila et al., IETF Standard-Working-Draft, Nov. 14, 2003, pp. 1-4.

Camarillo, G. et al., Grouping of Media Lines in the Session Description Protocol (SDP), Dec. 2002, pp. 1-22.

Japanese Office Action for corresponding JP Application No. 2007-520908, Apr. 4, 2011, Japan, pp. 1-6.

* cited by examiner

GROUPING OF SESSION OBJECTS

FIELD OF THE INVENTION

The present invention relates to communications. More particularly, the present invention relates to the grouping of objects transferred in a communications environment.

BACKGROUND OF THE INVENTION

File delivery (or "discrete media delivery") is an important service, often involving a one-to-many (or "multicast") transmission topology over systems such as IP multicast, Internet Protocol Device Control (IPDC) and Multimedia Broadcast/Multicast Service (MBMS). Unfortunately, many of the desirable file delivery features provided by point-to-point protocols, such as the File Transfer Protocol (FTP) and the Hyper Text Transfer Protocol (HTTP), are problematic for such one-to-many transmission scenarios. In addition, protocols such as the Transmission Control Protocol (TCP), which provide for the reliable or guaranteed delivery of files through the transmission of acknowledgements (ACKs), are not feasible in such one-to-many transmission scenarios.

The Reliable Multicast Transport (RMT) Working Group of the Internet Engineering Task Force (IETF) is in the process of standardizing two categories of error-resilient multicast transport protocols. In the first category, reliability is implemented through the use of (proactive) Forward Error Correction (FEC). In the second category, through the use of receiver feedback. Asynchronous Layered Coding (ALC) is a protocol instantiation belonging to the first category, while the NACK-Oriented Reliable Multicast (NORM) protocol belongs to the second category. These protocols can be used in a variety of networks. For instance, with respect to wireless multiple access networks, these protocols can be used in Universal Mobile Telecommunications System (UMTS) networks, Wireless Local Area Networks (WLANs), Direct Video Broadcasting-Terrestrial (DVB-T) networks and Direct Video Broadcast-Satellite (DVB-S) networks. Information regarding DVB communications can be found on the Internet at http://www.DVB.org.

File Delivery over Unidirectional Transport (FLUTE) is a transmission method that provides for massively scalable unidirectional multicast transmission. To achieve this functionality, FLUTE builds on FEC and ALC building blocks.

An Electronic Service Guide (ESG) is a set of metadata that is used to describe "programs", sessions, services and other information that a broadcast service provides. An ESG provides device users with information regarding, for example, programs, services, costs, and the like. An ESG also provides a device with information so that the device may receive the services.

When using FLUTE for transmitting service announcements/descriptions, it is desirable to have a method of grouping (relating) different fragments (or parts) of an ESG together using a session level (or higher or lower) grouping parameter. In addition, it is also desirable to relate objects other than metadata and ESG elements to each other. An example is audio and video files that are transmitted in the same session and form a movie application together. Unfortunately, such transmission methods (as well as receivers and transmitters) do not currently provide grouping capabilities.

SUMMARY OF THE INVENTION

The present invention provides techniques for grouping objects that are offered by an object delivery session, such as a FLUTE session. According to aspects of the invention, a method, apparatus, and computer program product may join an object delivery session. From the session, a description of a plurality of objects provided by the session is received. This description indicates one or more groupings of the plurality of objects. An interesting object is determined from the plurality of objects. Upon this determination, one or more of the plurality of objects are identified for downloading based on the interesting object and the description of the plurality of objects.

According to further aspects of the present invention, a method, apparatus, and computer program product may join an object delivery session, and receive from the session a description of a plurality of objects provided by the session, wherein the description indicates one or more groupings of the plurality of objects. A list is stored corresponding to one of the one or more groupings. This list may indicate which of the plurality objects belong to the corresponding grouping. Alternatively, this list may indicate which of the plurality objects belong to the corresponding grouping and are not currently in possession. In addition, one or more objects from the list may be selected and downloaded.

Also, the present invention provides a method, apparatus, and computer program product, that receives from an information source one or more identifiers corresponding to objects provided by an object delivery session. This information source is out-of-band from the object delivery session. Based on the one or more identifiers, an interesting object is determined from the plurality of objects. In addition, the object delivery session may be joined so that a description of the plurality of objects provided by the session is received. This description indicates one or more groupings of the plurality of objects. Based on the interesting object and the description of the plurality of objects, one or more of the objects are identified for downloading.

According to further aspects of the present invention, a device includes a display and a client. The display provides to a user an electronic service guide (ESG) having multiple metadata fragments. The client receives the metadata fragments from a object delivery session (such as a FLUTE session). In addition, the client receives a description (such as a File Delivery Table (FDT) Instance) of the objects provided by the session. This description indicates one or more groupings of the metadata.

In addition, the present invention provides a session provider having a storage portion and a communications portion. The storage portion has a plurality of objects, and a description that indicates one or more groupings of the plurality of objects. The plurality of objects and the description are associated with a delivery session. The communications portion transmits the plurality of objects and the description to the one or more clients of the session.

Further features and advantages of the present invention will become apparent from the following description and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION OF THE PREFERRED EMBODIMENTS

I. Operational Environment

Figure 1:
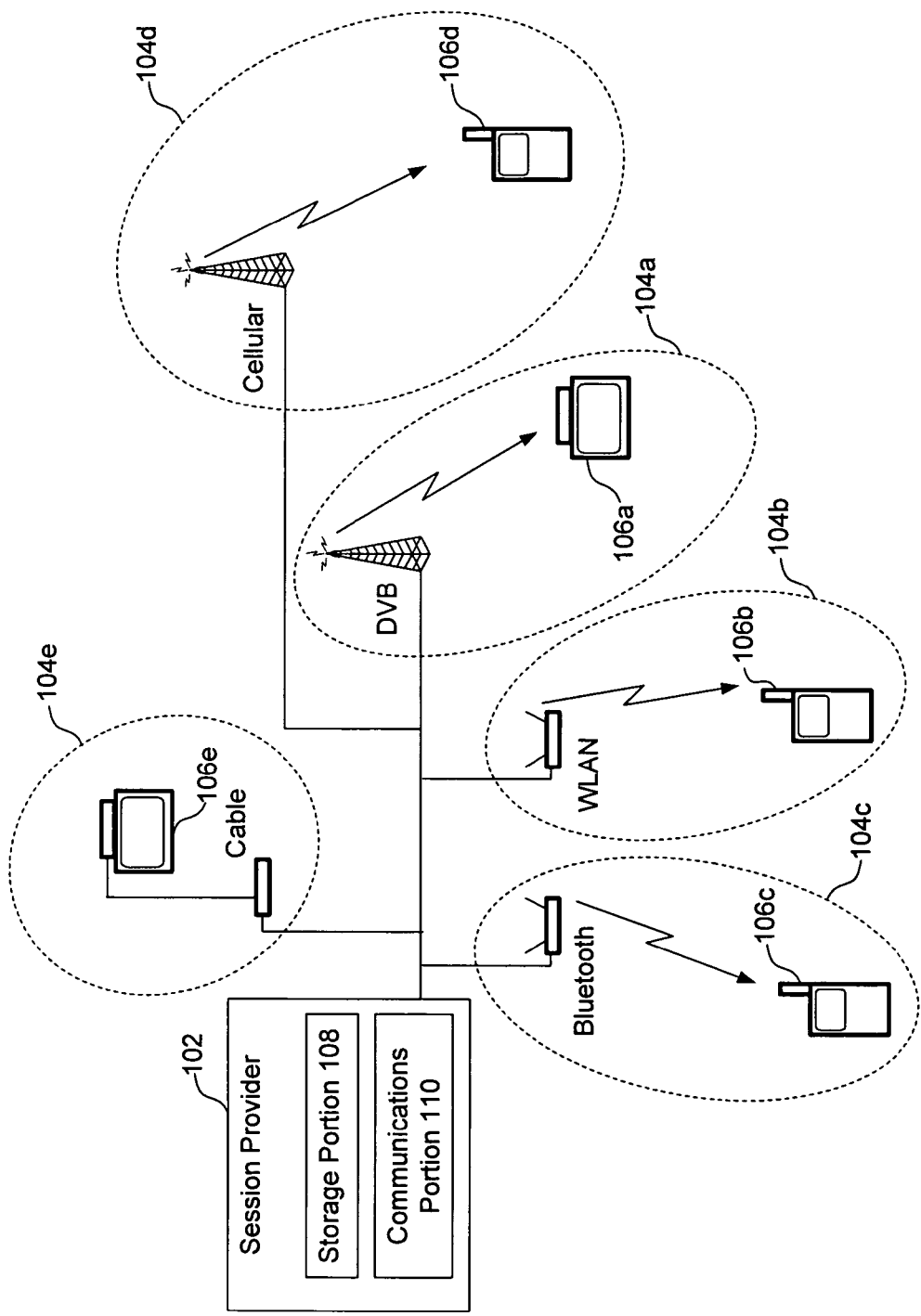
FIG. 1 is a diagram of an operational environment, according to an embodiment of the present invention.

Before describing the invention in detail, it is helpful to first describe an environment in which the invention may be employed. Accordingly, FIG. 1 is a diagram of an operational environment, according to an embodiment of the present invention. In this environment, information is transmitted from a session provider 102 to multiple terminal devices 106.

Session provider 102 transmits information in the form of a multicast session (such as a FLUTE session). This information may include multiple objects or files that may represent, for example, an ESG, a video broadcast, or the like. In addition, this information may include descriptions of the objects and grouping information regarding the objects. As shown in FIG. 1, session provider 102 includes a storage portion 108 and a communications portion 110. These portions may be implemented in hardware, software, firmware, or any combination thereof.

Storage portion 108 may store the multiple objects (e.g., files, metadata fragments, and/or metadata envelopes), and a description that indicates one or more groupings of the plurality of objects. The plurality of objects and the description are associated with a delivery session. Communications portion 110 transmits the plurality of objects and the description to clients of the session.

For instance, the information may be sent to the terminal devices across a plurality of distribution networks 104. These distribution networks include a DVB network 104a, a WLAN network 104b, a Bluetooth network 104c, a cellular network 104d, and a cable network (e.g., a Data-Over-Cable Service Interface Specification (DOCSIS) network) 104e. Accordingly, terminal devices 106, may exist in various implementations, such as mobile handsets, set top boxes, and the like. Although not shown, one or more intermediate networks (such as the Internet) may exist between session provider 102 and distribution networks 104.

II. Electronic Service Guide

The ESG information is transmitted to a user terminal as one or more metadata fragments. A metadata fragment is metadata (e.g. SDP, XML, etc.) that may contain a description of a service. A metadata envelope (usually XML) may be used for versioning, updating and expiring (or keeping information current) the metadata information (i.e. metadata fragment).

Figure 2A:
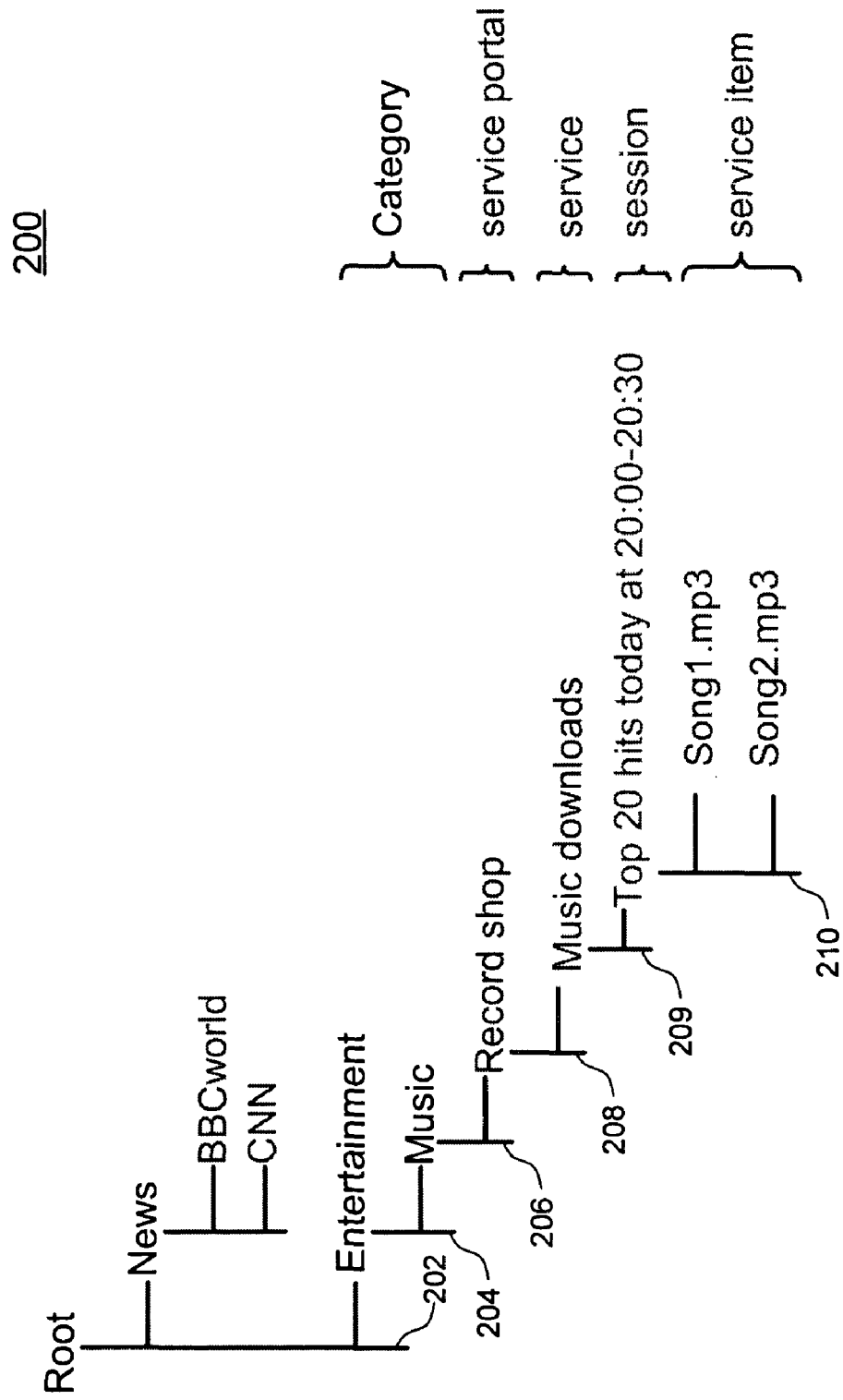
FIGS. 2A and 2B are diagrams of an electronic service guide, according to an embodiment of the present invention.

FIG. 2A is a diagram showing an exemplary ESG 200. As shown in FIG. 2, ESG 200 includes information that is arranged in a tree hierarchy having multiple levels. These levels include a root level 202, a category level 204, a service portal level 206, a service level 208, a session level 209, and a service item level 210.

Figure 2B:
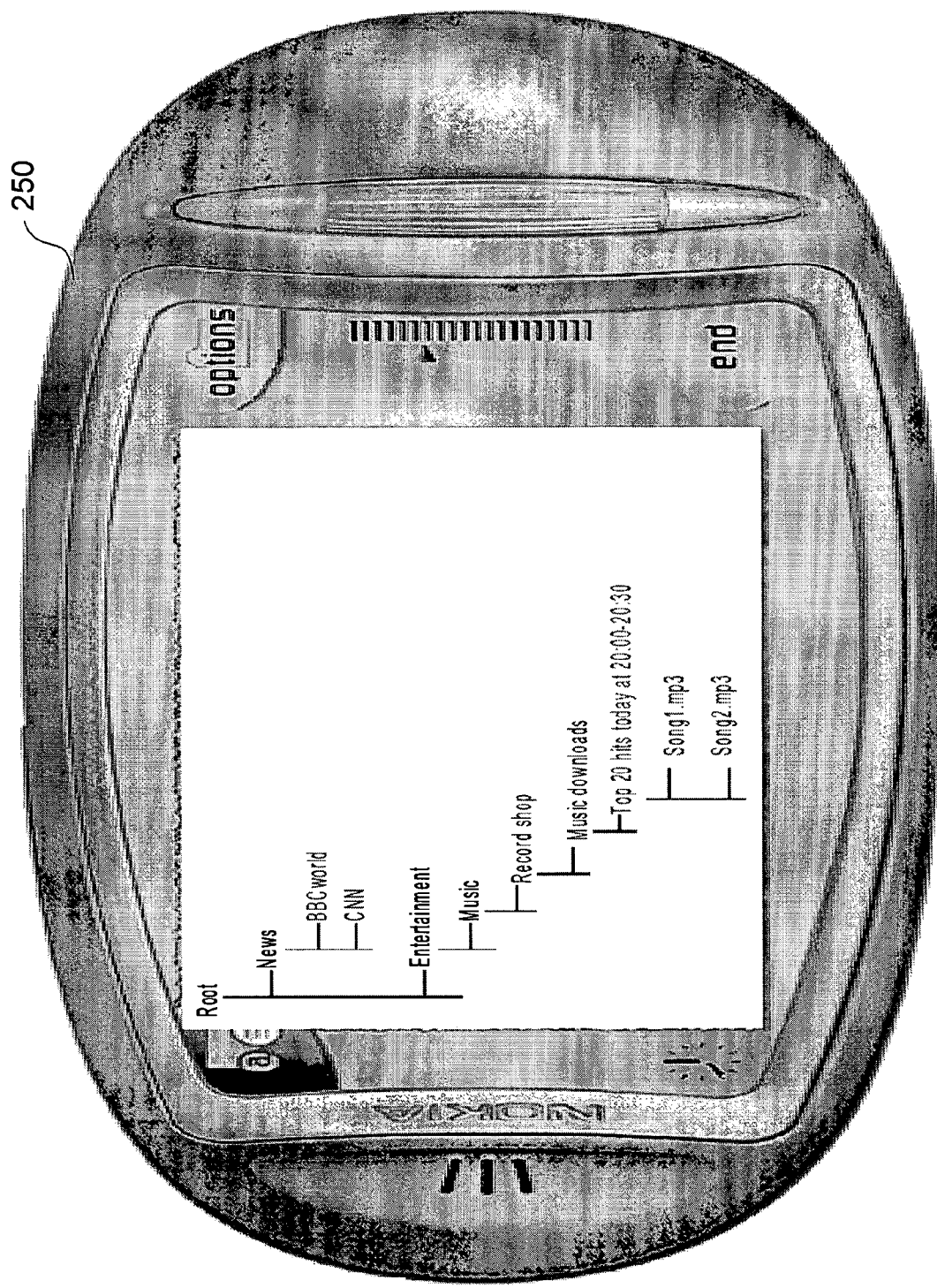

ESG 200 may be received by a device and presented to its user according to the techniques of the present invention. For example, FIG. 2B is a view of ESG 200 being displayed by a wireless communications device 250 according to an embodiment of the present invention.

III. ALC, LCT, and FLUTE

ALC is a protocol described in M. Luby et al., "Asynchronous Layered Coding (ALC) Protocol Instantiation," RFC 3450, The Internet Society, December 2002 ("RFC 3450"). This document is incorporated herein by reference in its entirety.

ALC is massively scalable (in terms of number of users), as no uplink signaling is required and so any amount of additional receivers does not put additional demands on the system. However, ALC is not 100% reliable, as it cannot guarantee reception, thus it is generally described as robust.

ALC provides congestion controlled reliable asynchronous delivery of content to an unlimited number of concurrent receivers from a single sender. This is performed by utilizing a Layered Coding Transport (LCT) building block, a multiple rate congestion control building block, and a Forward Error Correction (FEC) building block. ALC is designed to be used with the IP multicast network service and does not require feedback packets from receivers to the sender. Information, referred to as objects, are transferred from a sender to one or more receivers in an ALC session.

ALC can support several different reliable content delivery service models. One such model is called the push service model, involves the concurrent delivery of objects to a selected group of receivers. Another model is called the on-demand content delivery service model. In this model, a sender transmits an object (e.g., software) for a time period. During this time period, receivers may join the session and recover the object. This time period may be much longer in duration than the time required for a receiver to download the object. Thus, receivers join the session during such a time period and leave the session when they have received enough packets to recover the object. Such sessions are identified by a session description, which may be obtained, for example, through a web server. A LC uses a packet format that includes a user datagram protocol (UDP) header followed by an LCT header, an FEC payload ID, and a packet payload LCT is described in Luby, et al., "Layered Coding Transport (LCT) Building Block", RFC 3451, The Internet Society, December 2002. This document is incorporated herein by reference in its entirety. LCT provides transport level support for reliable content delivery and stream delivery protocols. An LCT session includes one or more related LCT channels that originate at a single sender. The channels are used for a period of time to convey packets containing LCT headers. These packets may be received by one or more receivers. Although LCT requires a connection from a sender to receiver(s), it does not require a connection from the receiver(s) to the sender. Accordingly, LCT may be used for both unicast and multicast delivery.

FLUTE is a protocol that builds on ALC to provide for the unidirectional delivery of files over the Internet. FLUTE 15 described in the Internet Draft by Paila, et al., entitled "FLUTE—File Delivery over Unidirectional Transport," June, 2004. This document is incorporated herein by reference in its entirety.

As described above, ALC defines the transport of arbitrary binary objects. However, for file delivery applications, the mere transport of objects does not provide receiving devices with necessary information that describes what the transported objects actually represent. FLUTE provides this necessary information with a mechanism that signals and maps the properties of files to ALC concepts.

An ALC/LCT session includes a set of logically grouped ALC/LCT channels associated with a single sender, which transmits packets having ALC/LCT headers for one or more objects. An ALC/LCT channel is defined by the combination of a sender and an address associated with the channel by the sender. A receiver joins a channel to start receiving the data packets sent to the channel by the sender, and a receiver leaves a channel to stop receiving data packets from the channel.

One of the fields carried in the ALC/LCT header is the Transport Session Identifier (TSI). The TSI is scoped by the source IP address, and a session is uniquely identified by the pairing of the source IP address and the TSI. Accordingly, a receiving device may use this pairing (which is carried in each packet) to identify the session corresponding to the packet.

Multiple objects may be transported in a session. To make objects distinguishable, the ALC/LCT header may include a Transport Object Identifier (TOI) field. In FLUTE sessions, the TOI is required for all transmitted packets. The TOI conveys a value indicating the particular object of the session that is associated with the packet. Each object has a unique TOI within the scope of a FLUTE session.

In FLUTE, a TOI field value of "0" signifies the delivery of a File Delivery Table (FDT) Instance, which may be repeated several times during a session. Moreover, each FDT Instance is uniquely identified by an FDT Instance ID. Accordingly, during a FLUTE session, packets are scoped by the TOI for file objects, and by both the TOI and the FDT Instance ID for FDT Instance objects.

The File Delivery Table (FDT) provides descriptive information (or attributes) regarding the files that are to be delivered within the FLUTE file delivery session. From an implementation perspective, the FLUTE FDT is a set of file description entries in which each entry is for a file to be delivered in the session. Each file description entry is required to include certain attributes. These required attributes include the TOI for the file that the entry describes and the URI identifying the file.

Examples of further attributes that may be conveyed in the FLUTE FDT include forward error correction (FEC) object transmission information for files (including the FEC Encoding ID and, if relevant, the FEC Instance ID). Other examples of file attributes include the size of the transport object carrying the file, and the aggregate rate of sending packets to all channels. Also, examples of TOI attributes for a file include MIME media type of the file, the size of the file, the encoding of the file, and a message digest of the file.

A receiver of the file delivery session (e.g., a terminal device) keeps an FDT database for received file description entries. The receiver maintains the database, for example, upon the reception of FDT Instances. Thus, at any given time the contents of the FDT database represent the receiver's current view of the FDT of the file delivery session.

Figure 4:
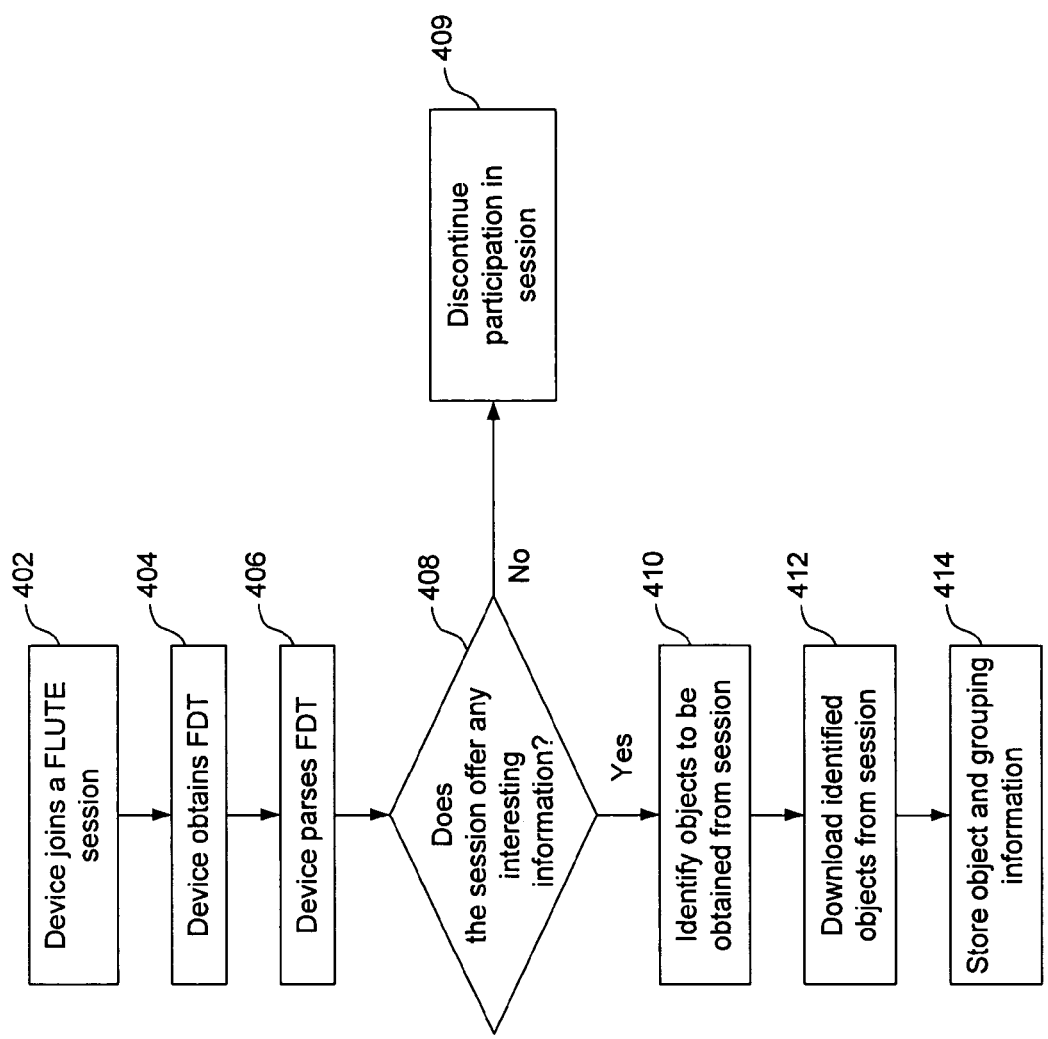
FIG. 4 is a flowchart of an operation in which a device obtains various objects, according to an embodiment of the present invention.

The steps of FIG. 4 are provided for purposes of illustration, not limitation. Accordingly, other sequences of steps, as well as the addition and/or removal of certain steps are within the scope of the present invention.

IV. Grouping of Objects

The present invention provides mechanisms for grouping various files and/or objects that are transmitted in a session, such as a FLUTE session. In embodiments, this mechanism involves the incorporation of a new attribute in the FLUTE FDT. This new attribute signals the grouping of various files and/or objects that are transmitted during a single session. Upon receipt of this attribute, a receiving device is signaled that particular files and/or objects transmitted during the session are related, and that these files and/or objects should be received in conjunction with each other.

The grouping mechanisms of the present invention provide for efficient delivery and reconstruction of transmitted data at the receiver. For example, such grouping mechanisms may be used to form a composite ESG from metadata fragments. The ESG is used to provide information to the user as well as the terminal regarding the available services.

Figure 3:
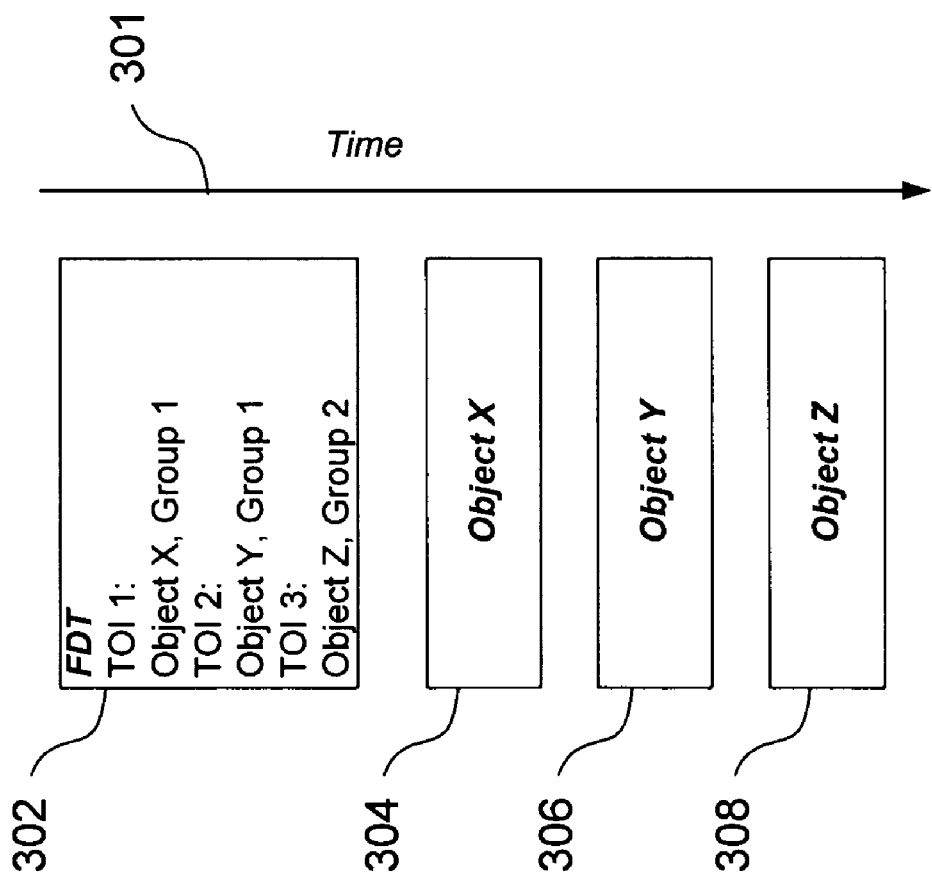
FIG. 3 is a diagram showing a grouping of objects in a delivery session, according to an embodiment of the present invention.

FIG. 3 is a diagram showing a sequence of transmissions in a FLUTE session along a time axis 301, according to an embodiment of the present invention. These transmissions include an FDT 302, an object 304 (also referred to as object X), an object 306 (also referred to as object Y), and an object 308 (also referred to as object Z).

FDT 302 identifies objects that are provided by the session. For instance, FDT 302 identifies object X, object Y, and object Z. In addition, FDT 302 provides relational information regarding these objects. This relational information is in the form of object groupings. In particular, FDT 302 indicates the existence of two groups: a group 1 and a group 2. As shown in FIG. 3, objects X and Y belong to group 1, while object Z belongs to group 2.

As shown in FIG. 3, FDT 302 is first transmitted, followed by the sequential transmission of objects 304, 306, and 308. However, transmissions may be in other sequences.

FIG. 4 is a flowchart of an exemplary operation according to an embodiment of the present invention in which a device obtains various objects from a FLUTE session provider. These objects may be metadata fragments that the device may use to build composite metadata or an ESG. This operation includes a step 402, in which the device joins a FLUTE session. This may be based on some (e.g., out-of-band) information that the device has received earlier and from which the device knows the correct session details (such as source IP address, port number, etc.). Out-of-band information may be information received from a different source and/or through a different communications medium.

In a step 404, the device obtains (receives) an FDT during the session. Once obtained, the device parses the FDT in a step 406.

In a step 408, the device determines whether the session offers any interesting information. For ESGs, examples of interesting information include metadata envelopes of an ESG, and metadata fragments (or parts of an ESG). This determination may be based on the FDT. Alternatively, this determination may be based on the information received from the out-of-band source. If the session offers any interesting information, then operation proceeds to a step 410. Otherwise, operation may proceed to an optional step 409 in which the device discontinues participation in the object delivery session.

In step 410, the device identifies information (e.g., objects) that it needs to obtain from the session based on the interesting information. This identified information includes all or a portion of the total information being transmitted during the FLUTE session. Upon receipt of the FDT, the device may determine that a particular interesting object belongs to a group having other objects. Accordingly, in embodiments, the device may identify in step 410 that it needs to obtain one or more objects from the session that share group membership with the interesting information determined in step 408.

A step 412 follows step 410. In this step, the device downloads the one or more objects that were identified in step 410 as sharing group membership with the interesting information determined in step 408.

In a step 414, the device stores information based on the object and grouping information conveyed in the FDT. This information may be a compilation of the objects that belong in certain groups. Accordingly, such a compilation may be in the form of one or more lists, where each list may include one or more objects, such as URIs, that belong to one or more particular groups (also referred to as "common-to-group objects"). For instance, a list may include all of the objects being transmitted during a session that belong to two particular groups. The device may then (in step 410) choose to download all the objects in this list.

In certain situations, the device may already have in its possession (e.g., stored in memory) some of the objects being transmitted during the session. When this is the case, the device may compile information from the FDT regarding objects, such as URIs, in groups that the device does not possess (also referred to as "new common-to-group objects"). As in the case above, such compilations may be in the form of lists, in which each list corresponding to one or more particular groups. The device may then download the objects that form this list during the session.

This feature is particularly useful in the case of ESGs where updated metadata fragments may be often transmitted within a session or as part of multiple sessions. The differentiation between "new" and "old" metadata fragments is done based on the versioning information that may be provided in a metadata envelope, in the fragment itself, or elsewhere (such as the FDT or out-of-band).

The identification of information in step 410 may be based on identifying group memberships of the various objects provided by the FLUTE session. With reference to the exemplary session of FIG. 3, the FLUTE session may transmit objects X and Y, which belong to the same group (i.e., group 1). As an example use case, object X may be a metadata envelope and object Y may be a metadata fragment that is referred to by object X.

Accordingly, in step 408, the device determines that object X is interesting and therefore identifies it as a needed object in step 410. However, since objects X and Y belong to the same group, the device also identifies object Y as a needed object in step 410. However, through the performance of step 408, the device may determine that object Z (which does not belong to group 1) is not interesting. This determination may be for various reasons. For example, object Z may be some software code or another metadata fragment that, while being referenced by the metadata envelope (object X), the receiver has decided in step 408 that it is not interesting. Moreover, since object Z belongs to a different group than the group of object X, the device does not identify it for downloading in step 410. As a result, in this example, the device downloads objects X and Y in step 412.

The grouping mechanism of the present invention may be used in a "receive one, receive all" fashion. That is, if the receiver receives any of the objects that are being transmitted as part of a group, then the receiver should receive all the objects being transmitted during the session that are part of this group. This functionality is useful in several applications, such as video download and ESG download. As an example of this "receive one, receive all" feature, when an object of a particular group is determined by the device as interesting in step 408, the device identifies all objects in that particular group as needed in step 410.

The grouping mechanism of the present invention may also be used to tie the reception of one or more metadata fragments with the reception of a metadata envelope. For instance, if a device identifies in step 408 as interesting a fragment being transmitted as part of a session within a group, then (according to this aspect) the device will identify the corresponding envelope being transmitted in the session (which is also part of the same group) as being needed in step 410.

Moreover, the grouping mechanism of the present invention may also be used as a "trigger" for an event. For instance, metadata fragments that form an ESG may be transmitted during a session as part of a group. The reception of all the objects that are part of this group may be enough to trigger a certain action at the device. For example, in the case of an ESG, the reception by a device of a certain amount of information will trigger the display of ESG information on the screen to the user. Alternatively, reception of this information may be enough to trigger joining another session by the device on possibly another channel.

A sender may send a certain Multipurpose Internet Mail Extension (MIME) type as part of a single group. MIME is a specification for formatting non-ASCII messages. This feature may aid the receiver in receiving these objects and using them appropriately, such as passing them on to an appropriate application. The grouping mechanism may be used in conjunction with the use of MIME types. For instance, the receiver may download only the metadata envelope first during a session. Then, based on the MIME types of the objects being transmitted during a session and the groups that object belongs to, the receiver may choose to download only certain objects from certain groups. For example, after receiving the FDT, a receiver may choose to receive only objects of the SDP MIME type that are part of a certain group X. This feature is very useful when objects or files are being transmitted for example using a carousel method.

V. Grouping Mechanisms

As described above, embodiments of the present invention provide for a new attribute to be added to the FLUTE syntax. In particular, the present invention provides various techniques for grouping and relating different files/objects that are delivered within the same FLUTE session. For instance, in embodiments, files/objects are grouped at the TOI level. However, in further embodiments, files/objects are grouped at the session level. Tables 1 and 2 provide examples of FDT instances in which objects are grouped at the TOI level.

TABLE 1

```
<FDT>
    <TOI ID="A₁">
        <Group = "Group X">
    </TOI>
    <TOI ID="A₂">
        <Group = "Group X">
    </TOI>
        ...
        ...
        ...
    <TOI ID="Aₙ">
        <Group = "Group X">
    </TOI>
</FDT>
```

The example of Table 1 shows the usage of a new attribute <Group="Group X">. This attribute is included as part of the FLUTE FDT. The attribute is included as part of the description of each object being transmitted in the FLUTE session. That is, the attribute is included on a "per-TOI" basis.

Objects belonging to more than one group may also be transmitted using this attribute. Table 2, below, is an FDT instance, providing an example of this feature.

TABLE 2

```
<FDT>
    <TOI ID="A₁">
        <Group = "Group X">
    </TOI>
    <TOI ID="A₂">
        <Group = "Group X">
    </TOI>
        ...
        ...
        ...
    <TOI ID="Aₙ">
        <Group = "Group X">
    </TOI>
    <TOI ID="B₁">
        <Group = "Group Y">
    </TOI>
    <TOI ID="B₂">
        <Group = "Group Y">
    </TOI>
        ...
        ...
        ...
    <TOI ID="Bm">
        <Group = "Group Y">
    </TOI>
</FDT>
```

On reception of the objects in the session, the receiver parses the FDT information and determines that the objects with the 'Group' attribute equal to 'X' are related to each other.

As described above, the grouping of objects may be done at the "session level" instead of the "object level" as in Tables 1 and 2. Table 3, below, provides an example of an FDT instance delivered in a FLUTE session with grouping done at the session level.

TABLE 3

```
<FDT>
    <Group = "Group X">
        <TOI ID="A₁">
        </TOI>
        <TOI ID="A₂">
        </TOI>
            ...
            ...
            ...
        <TOI ID="Aₙ">
        </TOI>
</FDT>
```

The example of Table 3 shows the use of the <Group="Group X"> parameter described above. However, in this case the parameter is used at a session level. That is, instead of using the parameter per TOI (or per object) in the FLUTE FDT, the FDT descriptions of the objects being transmitted in the FLUTE session are grouped together within a single <Group="Group X"> parameter as shown above.

When a receiving device parses through the FLUTE FDT of Table 3, it determines that the objects being delivered that are part of the group X in the FDT are related. The receiver may then combine the objects.

Further, multiple groups may be specified in a single FDT using this session level approach. An example of such a use case is provided below in Table 4.

TABLE 4

```
<FDT>
    <Group = "Group X">
        <TOI ID="A₁">
        </TOI>
        <TOI ID="A₂">
        </TOI>
            ...
            ...
            ...
        <TOI ID="Aₙ">
        </TOI>
    <Group = "Group Y">
        <TOI ID="B₁">
        </TOI>
        <TOI ID="B₂">
        </TOI>
            ...
            ...
            ...
        <TOI ID="Bm">
        </TOI>
</FDT>
```

An aspect of the present invention is that the same object may be present in multiple groups. In such a case, although the object (or file or fragment) is transmitted as a single instance in the session, it is associated with one or more groups by using the 'group' parameter described above. Examples of FDT instances in which objects are members of multiple groups are provided in Tables 5 and 6, below. In particular, Table 5 provides an example that employs session level grouping, while Table 6 provides an example that employs TOI level grouping.

TABLE 5

```
<FDT>
    <Group = "Group X">
        <TOI ID="A₁">
            URI = File 1
        </TOI>
        <TOI ID="A₂">
        </TOI>
            ...
            ...
            ...
        <TOI ID="Aₙ">
        </TOI>
    <Group = "Group Y">
        <TOI ID="A₁">
            URI = File 1
        </TOI>
        <TOI ID="B1">
        </TOI>
            ...
            ...
            ...
        <TOI ID="Bm">
        </TOI>
</FDT>
```

As shown in Table 5, above, File 1 is identified within the session by the use of the TOI A1. This file is transmitted as a single instance during the session. However, a receiving device interprets the grouping information in the FDT instance of Table 5 such that File 1 belongs to both groups X and Y.

Table 6, below, shows that the same multiple grouping can be achieved at the TOI level. In this FDT instance, the description of File 1 indicates to the receiver that File 1 belongs to both groups X and Y. Thus, even though only one instance of File 1 is transmitted during the session, a receiving device interprets from this FDT instance that File 1 belongs to both groups X and Y.

TABLE 6

```
<FDT>
    <TOI ID="A₁">
        URI = File 1
            <Group = "Group X">
            <Group = "Group Y">
    </TOI>
    <TOI ID="A₂">
            <Group = "Group X">
    </TOI>
        ...
        ...
        ...
    <TOI ID="Aₙ">
            <Group = "Group X">
    </TOI>
    <TOI ID="B₁">
            <Group = "Group Y">
    </TOI>
    <TOI ID="B₂">
            <Group = "Group Y">
    </TOI>
        ...
        ...
        ...
    <TOI ID="Bm">
            <Group = "Group Y">
    </TOI>
</FDT>
```

VI. Terminal Device

Figure 5:
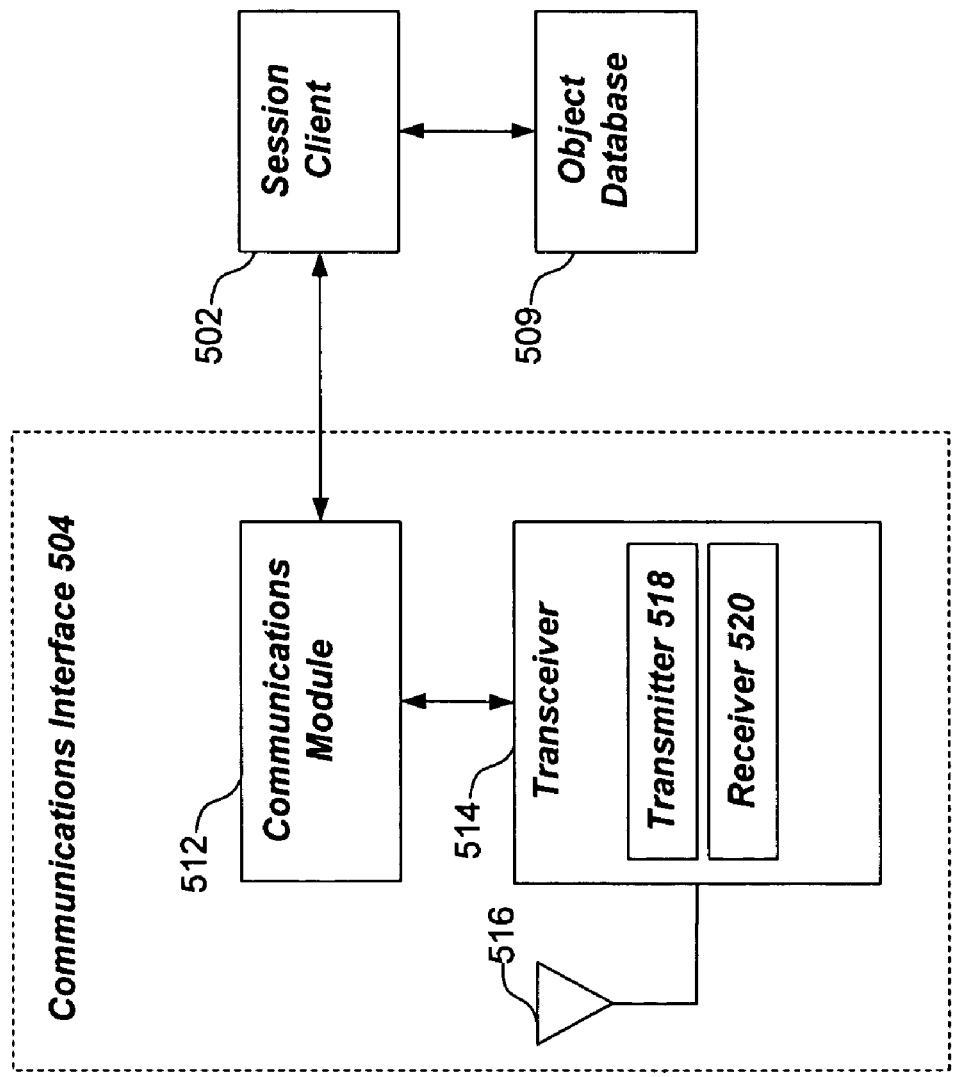
FIG. 5 is a diagram showing a terminal device architecture according to aspects of the present invention.

FIG. 5 is a diagram showing a terminal device architecture according to aspects of the present invention. This architecture includes a session client 502 (such as an ESG client), a communications interface 504 (e.g., a Bluetooth radio, a WLAN radio, a DVB receiver, or a cable interface), and an object database 509.

As shown in FIG. 5, session client 502 is coupled to communications interface 504. Communications interface 504 is responsible for the exchange (i.e., the reception and/or transmission) of communications signals with other devices. Interface 504 includes a communications module 512 and a transceiver 514. In addition, for architectures employing wireless communications, communications interface includes an antenna 516.

Communications module 512 performs functions related to link set-up, security and control. These functions may involve discovering corresponding remote devices and communicating with them according to one or more protocols. Such protocols may include link layer protocols and media access control protocols for communications technologies, such as Bluetooth, WLAN, DVB, cable (e.g., DOCSIS), cellular. Accordingly, module 512 performs baseband processing for transmissions, such as error correction encoding and decoding. In addition, communications module 512 exchanges data with corresponding entities at remote devices according to physical layer protocols. Examples of physical layer protocols include retransmission protocols such as the automatic repeat request (ARQ) protocol. Also, such protocols may involve (for example in DVB communications) the reception of one or more time-sliced burst transmissions.

Transceiver 514 includes electronics that allow (for example, in conjunction with antenna 516) the device of FIG. 5 to receive and exchange signals (e.g., DVB, Bluetooth and/or WLAN signals) with remote devices. Such electronics include modulators, demodulators, amplifiers, and/or filters. As shown in FIG. 5 transceiver 514 may include a transmitter 518 and a receiver 520. Transmitter 518 includes components (e.g., electronics) that provide for the transmission of signals, while receiver 520 includes components (e.g., electronics) that provide for the reception of signals. In alternate embodiments, device architectures may merely include a receiver, instead of transceiver 514.

Communications module 512 exchanges information with session client 502 according to higher layer protocols that the terminal device shares with one or more remote session providers. Examples of such protocols include ALC and FLUTE. Session client 502 may be, for example, an ESG client that receives ESG information (such as metadata) and displays the ESG information to a user through a user interface.

Object database 509 stores information received from remote session providers regarding the objects (e.g., files) that the session providers offer. Such information may include resource identifiers for the objects, such as Uniform Resource Identifiers (URIs), and grouping information regarding one or groups to which various objects may belong.

Figure 6:
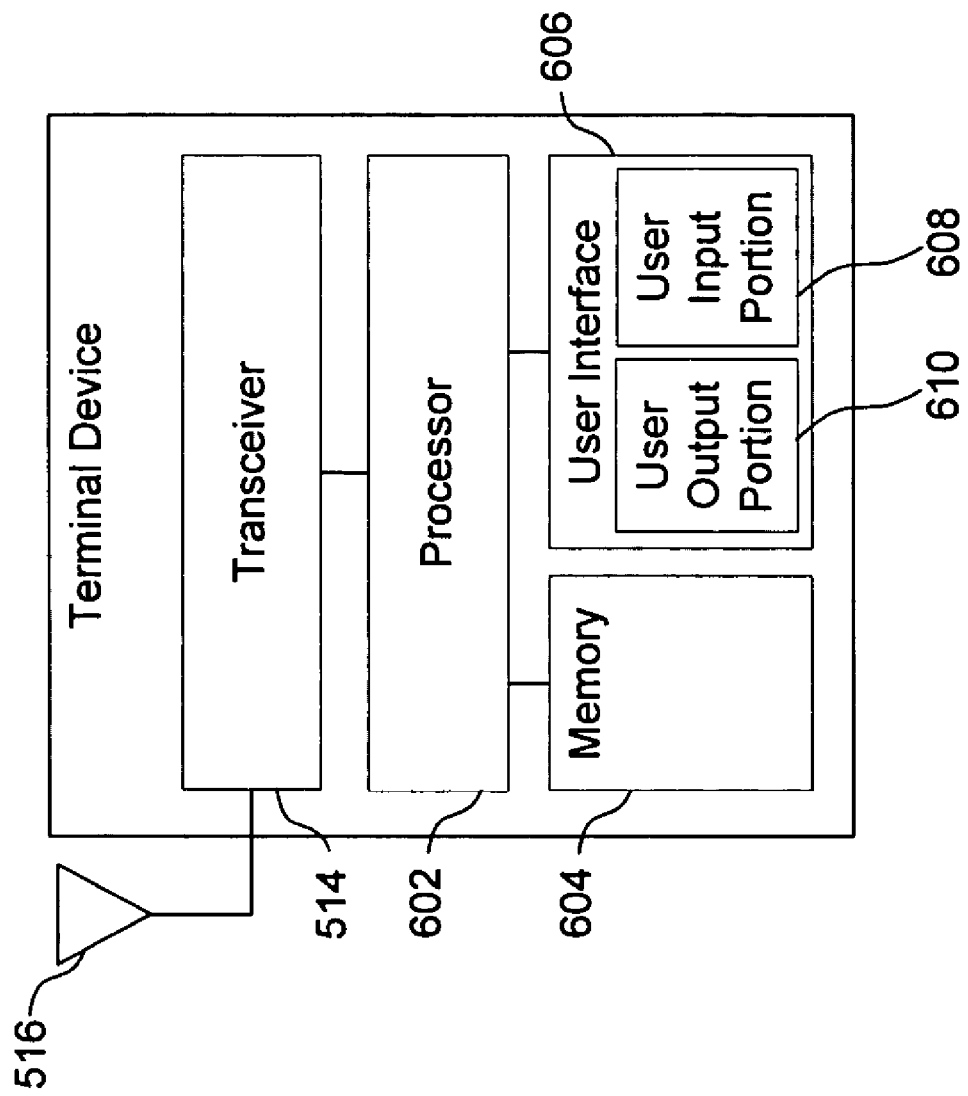
FIG. 6 is a diagram of a terminal device implementation according to aspects of the present invention.

The architecture of FIG. 5 may be implemented in hardware, software, firmware, or any combination thereof. One such implementation is shown in FIG. 6. This implementation includes a processor 602, a memory 604, and a user interface 606. In addition, the implementation of FIG. 6 includes transceiver 514, and antenna 516. Transceiver 514 may be implemented as described above with reference to FIG. 5.

As shown in FIG. 6, processor 602 is coupled to transceiver 514. Processor 602 controls device operation. Processor 602 may be implemented with one or more microprocessors that are each capable of executing software instructions stored in memory 604.

Memory 604 includes random access memory (RAM), read only memory (ROM), and/or flash memory, and stores information in the form of data and software components (also referred to herein as modules). These software components include instructions that can be executed by processor 602. Various types of software components may be stored in memory 604. For instance, memory 604 may store software components that control the operations of transceiver 514. Also, memory 604 may store software components that provide for the functionality of session client 502, communications module 512, and object database 509.

In addition, memory 604 may store software components that control the exchange of information through user interface 606. As shown in FIG. 6, user interface 606 is also coupled to processor 602. User interface 606 facilitates the device's interaction with a user. For example, user interface 606 provides for a user to access an ESG. FIG. 6 shows that user interface 606 includes a user input portion 608 and a user output portion 610. User input portion 608 may include one or more devices that allow a user to input information. Examples of such devices include keypads, touch screens, and microphones. User output portion 610 allows a user to receive information from the wireless communications device. Thus, user output portion 610 may include various devices, such as a display, and one or more audio speakers. Exemplary displays include liquid crystal displays (LCDs), and video displays.

The elements shown in FIG. 6 may be coupled according to various techniques. One such technique involves coupling transceivers 514, processor 602, memory 604, and user interface 606 through one or more bus interfaces. In addition, each of these components is coupled to a power source, such as a rechargeable and/or removable battery pack (not shown).

VII. Conclusion

While various embodiments of the present invention have been described above, it should be understood that they have been presented by way of example only, and not in limitation. For instance, although examples have been described involving FLUTE, other session delivery protocols and mechanisms are within the scope of the present invention.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
    causing, at least in part, joining an object delivery session by an apparatus according to a session delivery protocol;
    causing, at least in part, reception of a set of formatted description entries of a plurality of objects provided via the session at the apparatus according to the session delivery protocol, wherein each of the description entries includes one or more grouping parameters each of which indicates some of the plurality of objects to be downloaded as a group;
    determining, at the apparatus, an interesting object from the plurality of objects;
    based on the interesting object and the grouping parameters of the plurality of objects, automatically identifying at the apparatus one or more of the plurality of objects per group each including the interesting object; and
    causing, at least in part, downloading of the identified objects per group at the apparatus,
    wherein the grouping parameters are inserted in a file delivery table instance.

2. The method of claim 1, wherein the object delivery session is a file delivery over unidirectional transport (FLUTE) session.

3. The method of claim 2, wherein the set of description entries is included in the FDT.

4. The method of claim 2, wherein the FDT Instance indicates the one or more groupings of the plurality of objects at an object level.

5. The method of claim 2, wherein the FDT Instance indicates the one or more groupings of the plurality of objects at a session level.

6. The method of claim 1, further comprising triggering an event after the one or more identified objects are downloaded as a group.

7. The method of claim 6, wherein the event comprises displaying an electronic service guide to a user.

8. The method of claim 6, wherein the event comprises joining a further object delivery session.

9. The method of claim 1, further comprising combining together the downloaded objects per group,
    wherein the interesting object belongs to one or more groups.

10. The method of claim 9, further comprising identifying each object in the group of objects.

11. The method of claim 9, further comprising identifying each object in the group of objects having a particular multipurpose internet mail extension type.

12. The method of claim 1, comprising
    receiving information regarding the object delivery session from an information source that is out-of-band from the object delivery session.

13. The method of claim 12, wherein the information regarding the object delivery session includes details for joining the session.

14. The method of claim 13, wherein the details for joining the session include a source internet protocol address and a port number.

15. The method of claim 1, wherein the plurality of objects includes an electronic service guide metadata item.

16. The method of claim 1, wherein the plurality of objects includes an electronic service guide metadata envelope.

17. The method of claim 1, wherein each of the one or more groupings each correspond to a multipurpose internet mail extension type.

18. The method of claim 1, further comprising:
    determining, at the apparatus, an interesting metadata fragment from among plurality of metadata fragments;
    based on the interesting object and a metadata fragment grouping parameter in the description entries, identifying one or more of the plurality of metadata fragments for downloading per group at the apparatus.

19. The method of claim 1, wherein at least one of the plurality of objects provided by the session belongs to a plurality of the one or more groupings and is transmitted by the session as a single instance; and
    wherein the description entries indicate that the at least one of the plurality of objects belongs to the plurality of groupings.

20. The method of claim 1, further comprising storing the description entries of the plurality of objects.

21. A method comprising:
    causing, at least in part, storage at an apparatus of a plurality of objects and a set of formatted description entries of the plurality of objects formatted based upon a session delivery protocol, wherein each of the description entries includes one or more grouping parameters each of which indicates some of the plurality of objects to be downloaded as a group; and
    causing, at least in part, transmission of the plurality of objects and the set of formatted description entries to one or more clients joining an object delivery session provided by the apparatus according to the session delivery protocol,
    wherein the grouping parameters are inserted in a file delivery table instance.

22. The method of claim 21, wherein the object delivery session is a file delivery over unidirectional transport (FLUTE) session.

23. A method comprising:
    causing, at least in part, joining an object delivery session by an apparatus according to a session delivery protocol;
    causing, at least in part, reception of a set of formatted description entries of a plurality of objects provided via the session at the apparatus according to the session delivery protocol, wherein each of the description entries includes one or more grouping parameters each of which indicates some of the plurality of objects to be downloaded as a group;
    determining, at the apparatus, an interesting object from the plurality of objects;
    based on the interesting object and lists each corresponding to one group of objects previously downloaded at the apparatus, automatically identifying at the apparatus one or more of the lists each including the interesting object and automatically identifying one or more objects in the identified lists other than the interesting object; and
    downloading objects that are not the identified objects in the identified lists and are grouped with the interesting object by the one or more grouping parameters transmitted in the session per group at the apparatus, wherein the grouping parameters are inserted in a file delivery table instance.

24. The method of claim 23, wherein each of the lists includes a uniform resource identifier for each object that belongs to the corresponding grouping.

25. A method comprising:
causing, at least in part, reception from an information source of one or more identifiers each corresponding to one of a plurality of objects at an apparatus;
causing, at least in part, joining an object delivery session by the apparatus according to a session delivery protocol, wherein the information source is out-of-band from the object delivery session;
causing, at least in part, reception of a set of formatted description entries of the plurality of objects via an object delivery session at the apparatus according to the session delivery protocol, each of the description entries including one or more grouping parameters each of which indicates some of the plurality of objects to be downloaded as a group;
based on the one or more identifiers, determining at the apparatus an interesting object from the plurality of objects;
based on the interesting object and the grouping parameters of the plurality of objects, automatically identifying at the apparatus one or more of the plurality of objects per group each including the interesting object; and
causing, at least in part, downloading of the identified objects per group at the apparatus,
wherein the grouping parameters are inserted in a file delivery table instance.

26. The method of step 25, wherein the identifier receiving step is performed prior to the determining step.

27. The method of claim 25, wherein the object delivery session is a file delivery over unidirectional transport (FLUTE) session.

28. The method of claim 27, further comprising receiving the FDT Instance.

29. The method of claim 25, wherein the one or more identifiers are each uniform resource identifiers.

30. An apparatus, comprising:
at least one processor; and
at least one memory including computer program code,
the at least one memory and the computer program code configured to, with the at least one processor, cause the apparatus to perform at least the following,
join an object delivery session according to a session delivery protocol,
receive a set of formatted description entries of a plurality of objects provided via the session according to the session delivery protocol, wherein each of the description entries includes one or more grouping parameters each of which indicates some of the plurality of objects to be downloaded as a group,
determine an interesting object from the plurality of objects,
based on the interesting object and the grouping parameters of the plurality of objects, automatically identify one or more of the plurality of objects per group each including the interesting object, and
download the identified objects per group,
wherein the grouping parameters are inserted in a file delivery table instance.

31. The apparatus of claim 30, wherein the apparatus is further caused to receive the description entries in the form of one or more time-sliced burst transmissions.

32. An apparatus, comprising:
at least one processor; and
at least one memory including computer program code,
the at least one memory and the computer program code configured to, with the at least one processor, cause the apparatus to perform at least the following,
store a plurality of objects and a set of formatted description entries of the plurality of objects formatted based upon a session delivery protocol, wherein each of the description entries includes one or more grouping parameters each of which indicates some of the plurality of objects to be downloaded as a group, and
transmit the plurality of objects and the set of formatted description entries to one or more clients joining an object delivery session provided by the apparatus according to the session delivery protocol,
wherein the grouping parameters are inserted in a file delivery table instance.

33. The apparatus of claim 32, wherein the apparatus is further caused to receive the description entries in the form of one or more time-sliced burst transmissions.

34. An apparatus, comprising:
at least one processor; and
at least one memory including computer program code,
the at least one memory and the computer program code configured to, with the at least one processor, cause the apparatus to perform at least the following,
join an object delivery session according to a session delivery protocol;
receive a set of formatted description entries of a plurality of objects provided via the session according to the session delivery protocol, wherein each of the description entries includes one or more grouping parameters each of which indicates some of the plurality of objects to be downloaded as a group;
determine an interesting object from the plurality of objects;
based on the interesting object and lists each corresponding to one group of objects previously downloaded, automatically identify one or more of the lists each including the interesting object and automatically identifying one or more objects in the identified lists other than the interesting object; and
download objects that are not the identified objects in the identified lists and are grouped with the interesting object by the one or more grouping parameters transmitted in the session per group,
wherein the grouping parameters are inserted in a file delivery table instance.

35. The apparatus of claim 34, wherein the apparatus is further caused to receive the description entries in the form of one or more time-sliced burst transmissions.

36. An apparatus, comprising:
at least one processor; and
at least one memory including computer program code,
the at least one memory and the computer program code configured to, with the at least one processor, cause the apparatus to perform at least the following,
receive from an information source of one or more identifiers each corresponding to one of a plurality of objects;
join an object delivery session according to a session delivery protocol, wherein the information source is out-of-band from the object delivery session;
receive a set of formatted description entries of the plurality of objects via an object delivery session according to the session delivery protocol, each of the description entries including one or more grouping parameters each of which indicates some of the plurality of objects to be downloaded as a group;

based on the one or more identifiers, determine an interesting object from the plurality of objects;

based on the interesting object and the grouping parameters of the plurality of objects, automatically identify one or more of the plurality of objects per group each including the interesting object; and download the identified objects per group, wherein the grouping parameters are inserted in a file delivery table instance.

37. The apparatus of claim 36, wherein the apparatus is further caused to receive the one or more identifiers and the description entries in the form of one or more time-sliced burst transmissions.

38. A non-transitory computer-readable storage medium carrying one or more sequences of one or more instructions which, when executed by one or more processors, cause an apparatus to at least perform the following steps:

joining an object delivery session according to a session delivery protocol;

receiving a set of formatted description entries of a plurality of objects provided via the session according to the session delivery protocol, wherein each of the description entries includes one or more grouping parameters each of which indicates some of the plurality of objects to be downloaded as a group;

determining an interesting object from the plurality of objects;

based on the interesting object and the grouping parameters of the plurality of objects, automatically identifying one or more of the plurality of objects per group each including the interesting object; and downloading the identified objects per group, wherein the grouping parameters are inserted in a file delivery table instance.

39. A non-transitory computer-readable storage medium carrying one or more sequences of one or more instructions which, when executed by one or more processors, cause an apparatus to at least perform the following steps:

storing a plurality of objects and a set of formatted description entries of the plurality of objects formatted based upon a session delivery protocol, wherein each of the description entries includes one or more grouping parameters each of which indicates some of the plurality of objects to be downloaded as a group, and transmitting the plurality of objects and the set of formatted description entries to one or more clients joining an object delivery session provided by the apparatus according to the session delivery protocol, wherein the grouping parameters are inserted in a file delivery table instance.

40. A non-transitory computer-readable storage medium carrying one or more sequences of one or more instructions which, when executed by one or more processors, cause an apparatus to at least perform the following steps:

joining an object delivery session according to a session delivery protocol;

receiving a set of formatted description entries of a plurality of objects provided via the session according to the session delivery protocol, wherein each of the description entries includes one or more grouping parameters each of which indicates some of the plurality of objects to be downloaded as a group;

determining an interesting object from the plurality of objects;

based on the interesting object and lists each corresponding to one group of objects previously downloaded, automatically identifying one or more of the lists each including the interesting object and automatically identifying one or more objects in the identified lists other than the interesting object; and downloading objects that are not the identified objects in the identified lists and are grouped with the interesting object by the one or more grouping parameters transmitted in the session per group, wherein the grouping parameters are inserted in a file delivery table instance.

41. A non-transitory computer-readable storage medium carrying one or more sequences of one or more instructions which, when executed by one or more processors, cause an apparatus to at least perform the following steps:

receiving from an information source of one or more identifiers each corresponding to one of a plurality of objects;

joining an object delivery session according to a session delivery protocol, wherein the information source is out-of-band from the object delivery session;

receiving a set of formatted description entries of the plurality of objects via an object delivery session according to the session delivery protocol, each of the description entries including one or more grouping parameters each of which indicates some of the plurality of objects to be downloaded as a group;

based on the one or more identifiers, determining an interesting object from the plurality of objects;

based on the interesting object and the grouping parameters of the plurality of objects, automatically identifying one or more of the plurality of objects per group each including the interesting object; and downloading the identified objects per group, wherein the grouping parameters are inserted in a file delivery table instance.

42. A mobile terminal, comprising:

a transceiver configured to receive a set of formatted description entries of a plurality of objects provided via the session according to the session delivery protocol, wherein each of the description entries includes one or more grouping parameters each of which indicates some of the plurality of objects to be downloaded as a group, wherein the grouping parameters are inserted in a file delivery table instance;

a user interface configured to determine an interesting object from the plurality of objects;

a processor configured to join an object delivery session according to a session delivery protocol, based on the interesting object and the grouping parameters of the plurality of objects, automatically identify one or more of the plurality of objects per group each including the interesting object, and download the identified objects per group; and a display configured to provide an electronic service guide to a user, the electronic service guide comprising a plurality of metadata fragments.

43. The mobile terminal of claim 42, wherein the object delivery session is a file delivery over unidirectional transport (FLUTE) session.

44. The mobile terminal of claim 43, wherein the description entries include the FDT Instance.

45. A session provider, comprising:

a storage having a plurality of objects and a set of formatted description entries of the plurality of objects formatted based upon a session delivery protocol, each of the description entries including one or more grouping parameters each of which indicates some of the plurality of objects to be downloaded as a group, the grouping parameters being inserted in a file delivery table instance; and
a communications interface configured to transmit the plurality of objects and the set of formatted description entries to one or more clients joining an object delivery session provided by the apparatus according to the session delivery protocol.

* * * * *